United States Patent [19]
Austin

[11] 3,773,357
[45] Nov. 20, 1973

[54] TELESCOPE TRAILER TONGUE
[76] Inventor: Harvie Darrell Austin, 24 S.E. 39th, Oklahoma City, Okla. 73129
[22] Filed: Feb. 25, 1972
[21] Appl. No.: 180,411

[52] U.S. Cl. ................................................ 280/482
[51] Int. Cl. .............................................. B60d 1/16
[58] Field of Search............. 280/482, 150.5, 478 R, 280/491 B

[56] References Cited
UNITED STATES PATENTS
2,591,312   4/1952   Stees ..................................... 287/58
2,417,646   3/1947   Hallner ........................... 280/482 X
2,179,439   11/1939  Trow ................................... 280/482
3,326,573   6/1967   Neitzeg ............................... 280/482

Primary Examiner—Leo Friaglia
Attorney—Robert K. Rhea

[57] ABSTRACT

A tongue for use on various types of trailers, the tongue being of telescopic type so that it can be selectively extended or retracted for particular uses, the tongue accordingly being comprised of an inner sleeve or tongue that is slideable within an outer sleeve or tongue so that the towing vehicle can be controlled in distance from the towed vehicle.

2 Claims, 4 Drawing Figures

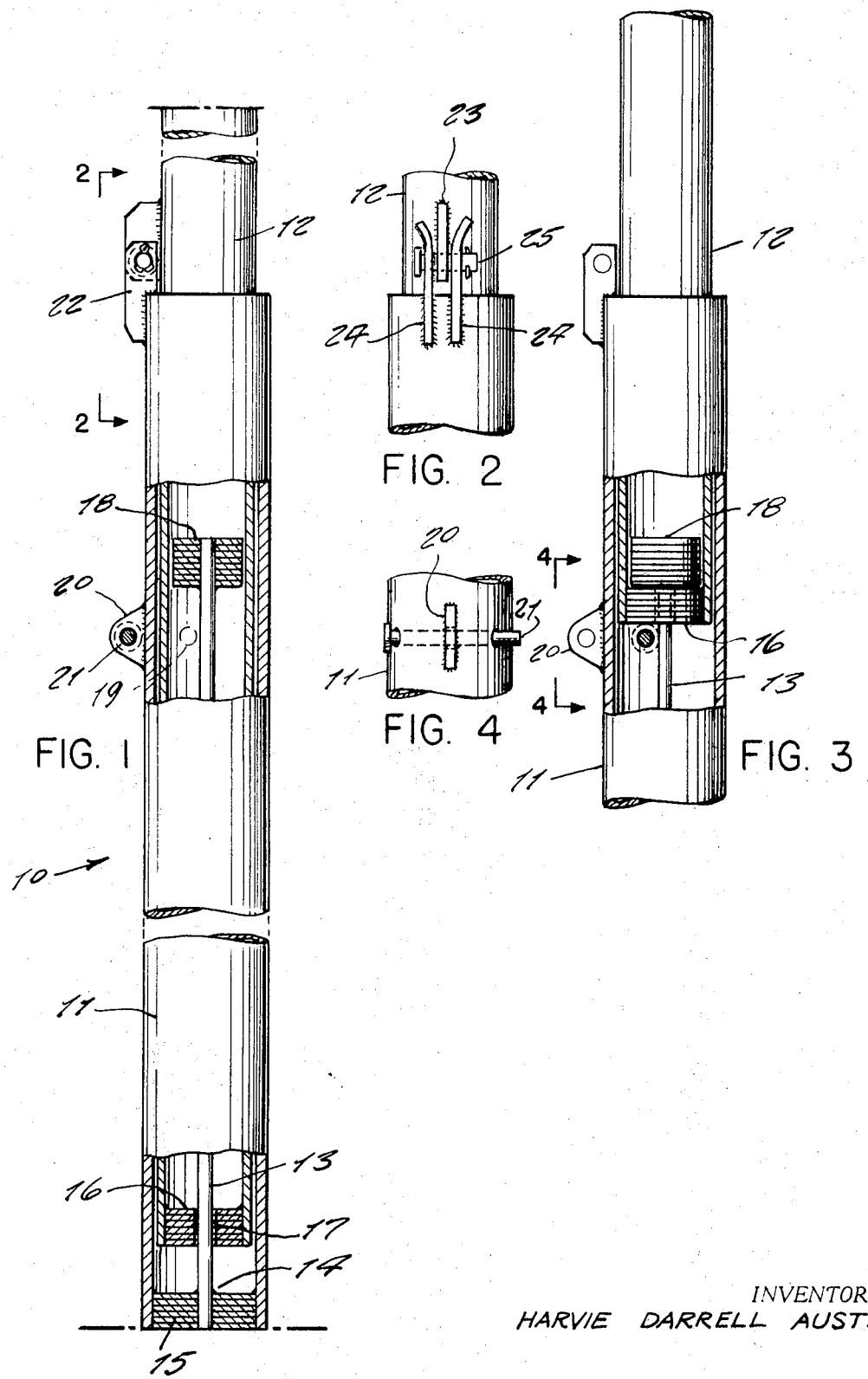

TELESCOPE TRAILER TONGUE

This invention relates generally to trailer hitches. More specifically the present invention relates to a tongue for a trailer hitch.

A principal object of the present invention is to provide a tongue for a trailer and wherein the tongue is longitudinally telescopic so that the distance between a towing vehicle and a towed vehicle can be selectively controlled.

Another purpose of the present invention is to provide a telescope trailer tongue which accordingly is suitable for various uses such as for a boat trailer so as to keep a towing vehicle out of water while launching or pulling a boat out of the water.

Yet another object of the present invention is to provide a telescope trailer tongue wherein bracket constructions are provided for quickly and easily securing the tongue in a closed position in a secure manner.

Still another purpose of the present invention is to provide a telescope trailer tongue which may be made in various different sizes and strengths so as to suit a particular load to be towed.

Other objects of the present invention are to provide a telescope trailer tongue which is simple in design, inexpensive to manufacture, rugged in construction, easy to use and efficient in operation.

These and other objects will be readily evident upon a study of the following specification and the accompanying drawing wherein:

FIG. 1 is a side elevation view of the present invention shown partly in cross section so to illustrate the interior structure, FIG. 2 is a fragmentary side elevation view as viewed along line 2—2 of FIG. 1, FIG. 3 is a fragmentary side elevation view shown partly in cross section and illustrating the tongue extended to its maximum limit, and FIG. 4 is a fragmentary side elevation view as viewed on line 4—4 of FIG. 3.

Referring now to the drawing in detail, the reference numeral 10 represents a telescope trailer tongue according to the present invention wherein there is an outer tongue 11 within which an inner tongue 12 is slideably telescopic. Each of the tongues comprises a sleeve like member as shown.

A stop rod 13 is welded as shown at 14 to an end plate 15 welded within one end of the outer tongue 11, the opposite end of the stop rod protruding into the inside tongue 12. The inside tongue 12 at its one end has an end plate 16 welded therewithin, the end plate 16 having a clearance opening 17 there through and through which the stop rod 13 protrudes. The terminal end of the stop rod 13 has a stop plate 18 welded there to for the purpose of abutting against the end plate 16 for stopping purposes as is illustrated in FIG. 3 of the drawing.

A transverse opening 19 through the outside tongue 11 is spaced so to miss the stop rod 13 and be behind the inside tongue when in an extended position by approximately one-half inch.

A pin retaining bracket 20 is secured to an outer side of the outer tongue 11 and which is provided for a stop pin 21 while in road use. This pin is to be inserted through the opening in the outside tongue so to keep the tongue in an extended position.

Another bracket 22 is also welded to the outside tongue 11, the bracket 22 being positioned to make contact with the intermediate plate bracket 23 welded to the inside tongue 12. Actually, as shown in FIG. 2 of the drawing, the bracket 22 comprises a pair of flat plates 24 which are spaced apart so that the bracket 23 is slideable there between, the outer ends of the bracket plates 24 being slightly rounded outwardly so to easily guide the bracket 23 there between when the tongues are telescoped together. The plates 24 are provided with an aperture transversely therethrough and which can be aligned with a transverse aperture in the bracket 23 so that a securing pin 25 can be inserted through the bracket apertures to rigidly keep the tongues 11 and 12 in telescoped position for towing purposes.

Thus there is provided a novel telescope trailer tongue having numerous advantages over conventional tongues.

I claim:

1. A telescoping trailer tongue, comprising:
   a sleeve-like outer tongue;
   a sleeve-like inner tongue longitudinally slidable within said outer tongue,
     the ends of said tongues, opposite their telescoped portions, adapted to be respectively connected with a towing vehicle and a towed vehicle;
   an outer tongue end plate secured within said outer tongue at its vehicle connected end;
   a stop rod secured, at one end, to said outer tongue end plate and projecting, at its other end portion into said inner tongue;
   an inner tongue end plate secured within said inner tongue at its end within said outer tongue,
   said inner tongue end plate having an opening permitting longitudinal sliding movement of said stop rod therethrough;
   a stop plate secured to the other end of said stop rod for abutting said inner tongue end plate and limiting telescopic expanding movement of said tongues,
   said outer tongue having a transverse opening therethrough spaced from said stop plate toward the vehicle connected end of said outer tongue a distance at least equal to the thickness of said inner tongue plate;
   a stop pin projecting through the opening in said outer tongue for maintaining said tongues in a telescopic expanded position;
   a stop pin retaining bracket secured to the periphery of said outer tongue intermediate its ends;
   a pair of transversely apertured bracket plates longitudinally secured in spaced-apart relation to the end portion of said outer tongue opposite its vehicle connected end;
   an intermediate bracket plate slidably received between said pair of bracket plates and longitudinally secured to said inner tongue intermediate its ends, said intermediate bracket plate having an aperture aligned with the apertures in said pair of bracket plates when said tongues are telescoped together; and,
   a securing pin extending through the apertures in said bracket plates.

2. The trailer tongue according to claim 1 wherein one end portion of said pair of bracket plates extends beyond the end of said outer tongue opposite its vehicle connected end,
   said one end portion of said pair of bracket plates each being arcuately curved laterally away from each other to increase the spacing therebetween for loosely receiving said intermediate bracket plate.

* * * * *